(12) United States Patent
Nakagama et al.

(10) Patent No.: US 8,045,209 B2
(45) Date of Patent: Oct. 25, 2011

(54) IMAGE PROCESSING APPARATUS

(75) Inventors: Kiyohari Nakagama, Fujisawa (JP);
Kouichi Hanada, Yokohama (JP);
Toyotsugu Sawaki, Toyohashi (JP);
Hiroji Ito, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1281 days.

(21) Appl. No.: 11/489,127

(22) Filed: Jul. 19, 2006

(65) Prior Publication Data
US 2007/0188805 A1 Aug. 16, 2007

(30) Foreign Application Priority Data
Feb. 15, 2006 (JP) .................. 2006-037344

(51) Int. Cl.
*G06K 15/00* (2006.01)
*G06K 15/02* (2006.01)
(52) U.S. Cl. .......................... 358/1.16; 358/1.2
(58) Field of Classification Search ................ 358/1.1, 358/1.2, 1.9, 1.15, 1.16, 1.18, 2.1, 448, 462
See application file for complete search history.

(56) References Cited

U.S. PATENT DOCUMENTS

| | | | |
|---|---|---|---|
| 4,774,546 A | 9/1988 | Corona et al. | |
| 4,884,106 A | 11/1989 | Harris | |
| 5,065,185 A | 11/1991 | Powers et al. | |
| 5,214,755 A * | 5/1993 | Mason | 715/209 |
| 5,303,342 A | 4/1994 | Edge | |
| 5,325,449 A | 6/1994 | Burt et al. | |
| 5,479,597 A | 12/1995 | Fellous | |
| 5,646,744 A | 7/1997 | Knox | |
| 5,832,140 A | 11/1998 | Stapleton et al. | |
| 5,878,321 A | 3/1999 | Miyazaki et al. | |
| 6,064,399 A | 5/2000 | Teo | |
| 6,115,509 A | 9/2000 | Yeskel | |

(Continued)

FOREIGN PATENT DOCUMENTS
JP 7-111583 A 4/1995
(Continued)

OTHER PUBLICATIONS

Related U.S. Appl. No. 11/489,128, filed Jul. 19, 2006; Inventor: Kiyohari Nakagama et al.

(Continued)

*Primary Examiner* — Twyler Haskins
*Assistant Examiner* — Christopher D Wait
(74) *Attorney, Agent, or Firm* — Holtz, Holtz, Goodman & Chick, P.C.

(57) ABSTRACT

Detection section 22 detects the blank space area in each page for all pages of the document, determining section 23 determines image size for combining a designated stamp image in uniform size in all the pages of that document based on a detection result by detection section 22. Combining section 24 combines the stamp image determined by determining section 23 in each page of the document. For example, size of the maximum blank space area which can fit within blank space areas of all pages of the document in uniform size, is sought, image combining is carried out with an original size if the original size of the stamp image is not larger than the maximum blank space area size, and the stamp image is combined to be in a reduced size so that it fits within the maximum blank space area size if the original size of the stamp image exceeds the maximum blank space area size.

15 Claims, 15 Drawing Sheets

U.S. PATENT DOCUMENTS

| | | | |
|---|---|---|---|
| 6,404,915 B1 | 6/2002 | Yung et al. | |
| 6,516,170 B2 | 2/2003 | Tsukamoto et al. | |
| 6,704,456 B1 | 3/2004 | Venable | |
| 6,738,154 B1 | 5/2004 | Venable | |
| 6,760,638 B1 | 7/2004 | Love et al. | |
| 6,771,396 B1 | 8/2004 | Cheatle et al. | |
| 6,839,466 B2 | 1/2005 | Venable | |
| 6,895,106 B2 | 5/2005 | Wang et al. | |
| 6,977,754 B2 | 12/2005 | Matsumoto et al. | |
| 6,990,255 B2 | 1/2006 | Romanik et al. | |
| 7,046,404 B2 | 5/2006 | Cheatle et al. | |
| 7,281,209 B2 * | 10/2007 | Nara et al. | 715/255 |
| 7,292,375 B2 | 11/2007 | Nishida | |
| 7,362,471 B2 | 4/2008 | Date | |
| 7,433,098 B2 | 10/2008 | Klein et al. | |
| 7,523,864 B2 * | 4/2009 | Manheim | 235/462.01 |
| 2003/0056174 A1 * | 3/2003 | Nara et al. | 715/514 |
| 2004/0124242 A1 * | 7/2004 | Critelli et al. | 235/462.08 |
| 2005/0196070 A1 | 9/2005 | Takakura et al. | |
| 2006/0022050 A1 * | 2/2006 | Critelli et al. | 235/462.08 |
| 2006/0050961 A1 | 3/2006 | Thiyagarajah | |
| 2006/0279814 A1 | 12/2006 | Fukada et al. | |
| 2007/0188810 A1 | 8/2007 | Nakagama et al. | |

FOREIGN PATENT DOCUMENTS

| | | | |
|---|---|---|---|
| JP | 09-086015 A | | 3/1997 |
| JP | 09-247425 A | | 9/1997 |
| JP | 2000-209433 A | | 7/2000 |
| JP | 2000-324332 A | | 11/2000 |
| JP | 2001-197292 A | | 7/2001 |
| JP | 2003-110842 A | | 4/2003 |
| JP | 2003-127474 A | | 5/2003 |
| JP | 2003-134324 A | | 5/2003 |
| JP | 2003-330692 A | | 11/2003 |
| JP | 2005-286934 A | | 10/2005 |
| JP | 2005-303851 A | | 10/2005 |
| JP | 2006-033260 A | | 2/2006 |
| JP | 2006-041802 A | | 2/2006 |
| JP | 2007221282 A | * | 8/2007 |

OTHER PUBLICATIONS

Japanese Office Action dated Aug. 17, 2010 (and English translation thereof) in counterpart Japanese Application No. 2006-060576.
Japanese Office Action (and English translation) dated Oct. 31, 2007 which was issued in a Japanese Application corresponding to related U.S. Appl. No. 11/489,128.

* cited by examiner

FIG. 13

| PAGE NUMBER | POSITION | SIZE (VERTICAL X HORIZONTAL) |
|---|---|---|
| FIRST PAGE | TOP RIGHT | 30 mm x 28 mm |
| SECOND PAGE | TOP RIGHT | 40 mm x 35 mm |
| THIRD PAGE | BOTTOM RIGHT | 25 mm x 30 mm |
| FOURTH PAGE | TOP RIGHT | 50 mm x 50 mm |

⇩
LARGEST AREA SIZE
25 mm x 28 mm

IMAGE PROCESSING APPARATUS

RELATED APPLICATION

This application is based on Japanese Patent Application No. JP2006-037344 filed on Feb. 15, 2006, in Japanese Patent Office, the entire content of which is hereby incorporated by reference.

BACKGROUND

1. Field of the Invention

The present invention relates to an image processing apparatuses to combine an additional image with an original image.

2. Description of the Related Art

When a document is duplicated or printed from a personal computer, there is available a printing apparatus which prints a document by adding additional images such as company's logo, "CONFIDENTIAL" or "COPYING PROHIBITED", to the document. An adding position of the additional image is usually designated by a user, and there is known a technology that detects a width of blank space at a designated position, and combines the images after changing or shifting the scale of the additional image so as to adjust it to the width of blank space (see, for example, Patent Document 1).

Patent Document 1: Japanese Unexamined Patent Application Open to Public Inspection No. Tokkaihei 7-111583

In the above technology where a scale of the additional image is automatically changed and shifted to combine the additional image, when additional images are added to each page of a document having a plurality of pages, a condition of combining the additional image is changed according to the images of each page, and thereby, there is occurred a case where uniformity in the position or size of the stamp is lost in the entire document.

For example, in offices of patent attorneys in the U.S.A., legal documents such as court documents are prepared in three sets, one set for submitting to a court, one set for retaining in the attorney's office/law firm, and one set for a client, and as proof of having prepared these three sets of documents, a stamp (called Bates Stamp) having a logo of the attorney's office/law firm, date, and page number is affixed manually in a blank part of each page so that it does not overlap with an original images.

In the case of combining the stamp automatically by an apparatus, in order to reduce labor of affixing this stamp, if a scale of the stamp is changed and its position is shifted, the uniformity of the entire document is lost and there is occurred a problem that appearance of the document is not impressive.

The present invention is made in order to solve the above problem, and the object of the present invention is to provide an image processing apparatus that combines an additional image in uniform size without overlapping with the original images for all pages of the document.

Further, another object of the present invention is to provide an image processing apparatus that can combine the additional image in uniform size and in the same position without overlapping with the original image for all pages of the document.

SUMMARY

In view of foregoing, an object of this invention is to solve at least one of the problems, and to provide new image processing apparatus. The image processing apparatus comprises a detecting section to detect blank space areas in each page of a document; an additional image designating section to designate an additional image to be added to each page of the document, a determining section to determine image size of the additional image to be uniform on each page of the document based on a detected result by the detecting section; and a combining section to combine the additional image on each page of the document to be in the image size determined by determining section.

According to another aspect of the present invention, the image processing apparatus comprises a detecting section to detect a blank space area in a predetermined area on each page of a document; an additional image designating section to designate an additional image to be added to the predetermined area on each page of the document; a determining section to determine image size of the additional image to be uniform on each page of the document based on a detecting result by the detecting section; and a combining section to combine the additional image within the predetermined areas on each page of the document to be in the image size determined by the determining section.

The invention itself, together with further objects and attendant advantages, will best be understood by reference to the following detailed description taken in conjunction with the accompanying drawings.

BRIEF DESCRIPTION OF THE DRAWINGS

FIG. 13 is an explanatory diagram displaying a list of blank space area size and position detected from blank space areas.

In the following description, like parts are designated by like reference numbers throughout the several drawings.

DESCRIPTION OF THE PREFERRED EMBODIMENT

Various embodiments of the present invention are explained below with reference to the drawings.

Figure 1:
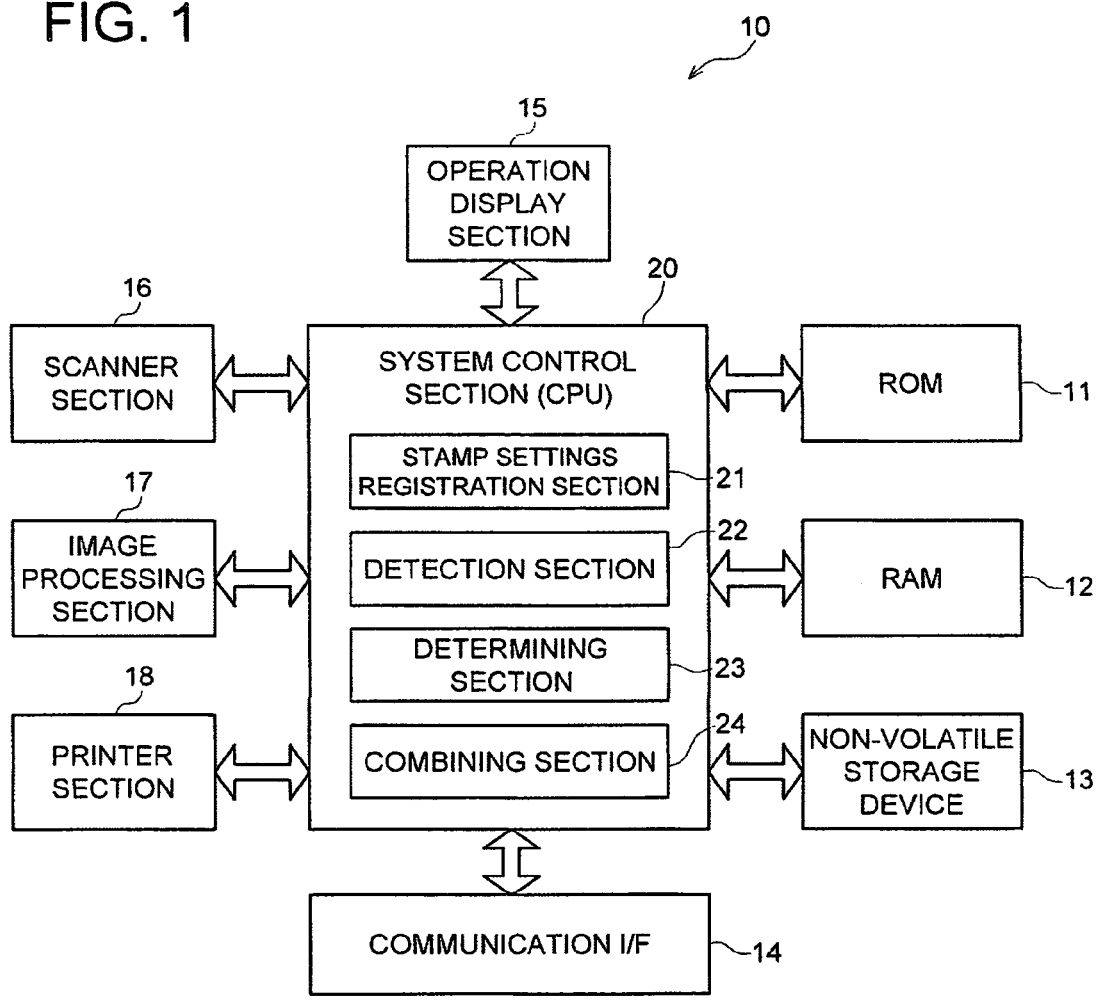
FIG. 1 is an explanatory diagram showing a configuration of an image processing apparatus related to an embodiment of the present invention.

FIG. 1 shows an outline configuration of an image processing apparatus 10 related to an embodiment of the present invention. The image processing apparatus 10 is configured as an multi-function peripheral that has a printer function to print based on print data received from an external terminal, a scanner function to read out the image from the original document, store corresponding image data and output to an external device, and a facsimile function to transmit and receive image data via communication lines, besides a function of a copying machine that reads out the image from an original document and copies it on a recording paper, etc.

Further, the image processing apparatus 10 is provided with a function to add a designated additional image to an original image and to print out a composite image. An example of combining Bates stamp (hereinafter referred to merely as a stamp) as the additional image is described in detail as follows.

The image processing apparatus 10 to carry out the above functions has system control section 20 whose main part is a CPU (Central Processing Unit), and system control section 20 configured to be connected to ROM (Read Only Memory) 11, RAM (Random Access Memory) 12, non-volatile storage device 13, a communication I/F (Interface) 14, operation and display section 15, a scanner section 16, image processing section 17, and printer section 18.

The ROM 11 stores various types of programs and fixed data, and system control section 20 comprehensively controls the operations of image processing apparatus 10 by executing programs stored in ROM 11. RAM 12 is a memory that can read and write freely and is used as the work memory when system control section 20 executes the programs.

Non-volatile storage device 13 is configured using non-volatile semiconductor memories and a hard disk drive unit, and is used for storing various types of registration data, and for storing large volumes of image data. The contents of additional images designated by the user are stored in non-volatile storage device 13.

Scanner section 16 is a reading device that optically reads out images of the original document and outputs an corresponding image data. Scanner section 16 is configured using a line image sensor. Scanner section 16 is provided with an automatic document feeder unit that is not shown in drawing. Here, sheets are fed one by one successively from a plurality of document sheets placed in the document tray to be read out.

Image processing section 17 has a function of carrying out various types of processes on the image data such as enlarging, reducing, rotating, compressing, decompressing, etc. Also, it carries out a process of reducing Bates image if necessary.

Printer section 18 carries out functions of a printing device that forms images on the recording sheets. Here, this section is configured as a laser printer based on electro-photographic process having a recording sheet conveying apparatus, photoconductor drums, charging units, laser units, developing units, transferring and separating units, cleaning units, and a fixing unit.

Communication interface 14 carries out a function of communicating with external terminals such as a personal computer via a network. For example, it receives print instructions of print data from an external terminal. The image data of the original image which is combined with the additional image can be inputted via communication interface 14.

Operation display section 15 has a display section such as an LCD (Liquid Crystal Display) and an operation section. The operation section is configured with operation switches and a touch panel arranged on the liquid crystal display screen. In operation display section 15, screens indicating the operating status of image processing apparatus 10 are displayed besides various types of operation screens and setting screens. Operation display section 15 carries out a function of receiving registration of settings of Bates stamps. Meanwhile, it is possible to carry out the registration of settings of Bates stamps from an external terminal via communication interface 14.

The system control section 20 carries out functions of stamp setting registration section 21, detection section 22, determining section 23, and combining section 24.

Stamp setting registration section 21 carries out functions of receiving settings of contents of Bates stamp from the user, and storing the contents of those settings in non-volatile storage device 13. The detection section 22 carries out the function of detecting blank space areas on a page for all pages in the document for combining Bates stamp.

Determining section 23 carries out a function of determining image size for combining Bates stamp designated by the user on all the pages of the document in uniform size based on the detection result of detection section 22. Combining section 24 carries out a function of combining Bates stamp with image data of each page to be in the image size that is determined by determining section 23. Also, it selects the combining position when the combining position is not designated.

Figure 2:
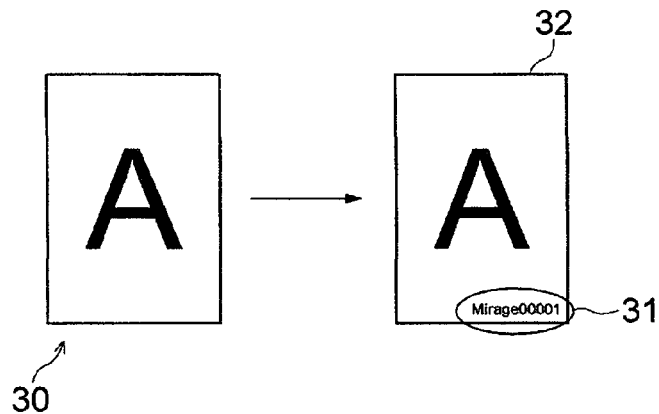
FIG. 2 is an explanatory diagram showing an example of a legal document having Bates stamp combined with it.
Figure 2:
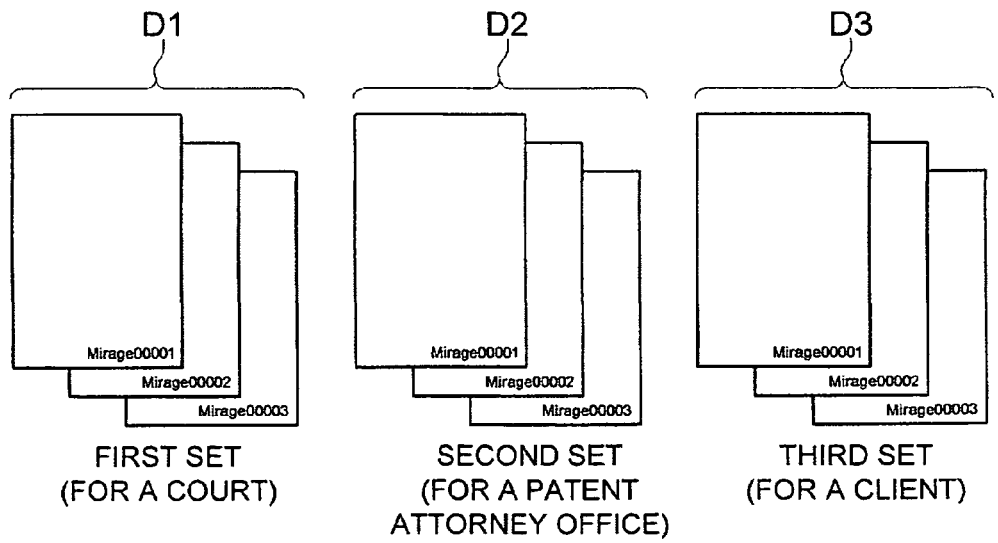

FIG. 2(a) shows original image 30 and composite image 32 obtained by combining Bates stamp 31 with original image 30. In attorney's offices/law firms in the United States of America, as shown in FIG. 2(b), legal documents such as court documents are prepared in three sets, one set for submitting to a court, one set for retaining in the attorney's office/law firm, and one set for a client. Image processing apparatus 10 combines Bates stamp having a logo of the attorney's office/law firm, date, and page number with an original image by image processing on each page of the original document and prints out the first set D1 of the documents. The second set D2 and the third set D3 are created by copying the first set D1.

Next, the registration of settings of Bates stamp in image processing apparatus 10 is described here.

Figure 3:
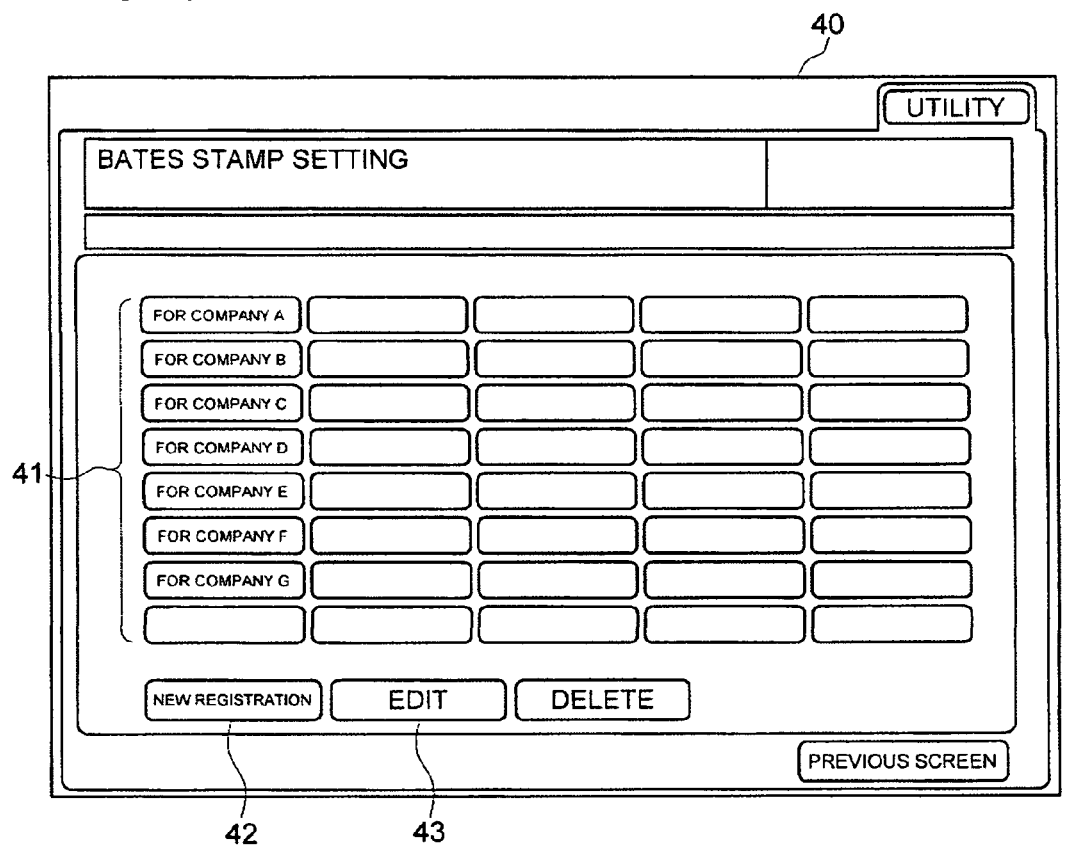
FIG. 3 is a front view showing an example of Bates stamp registration list screen.
Figure 4:
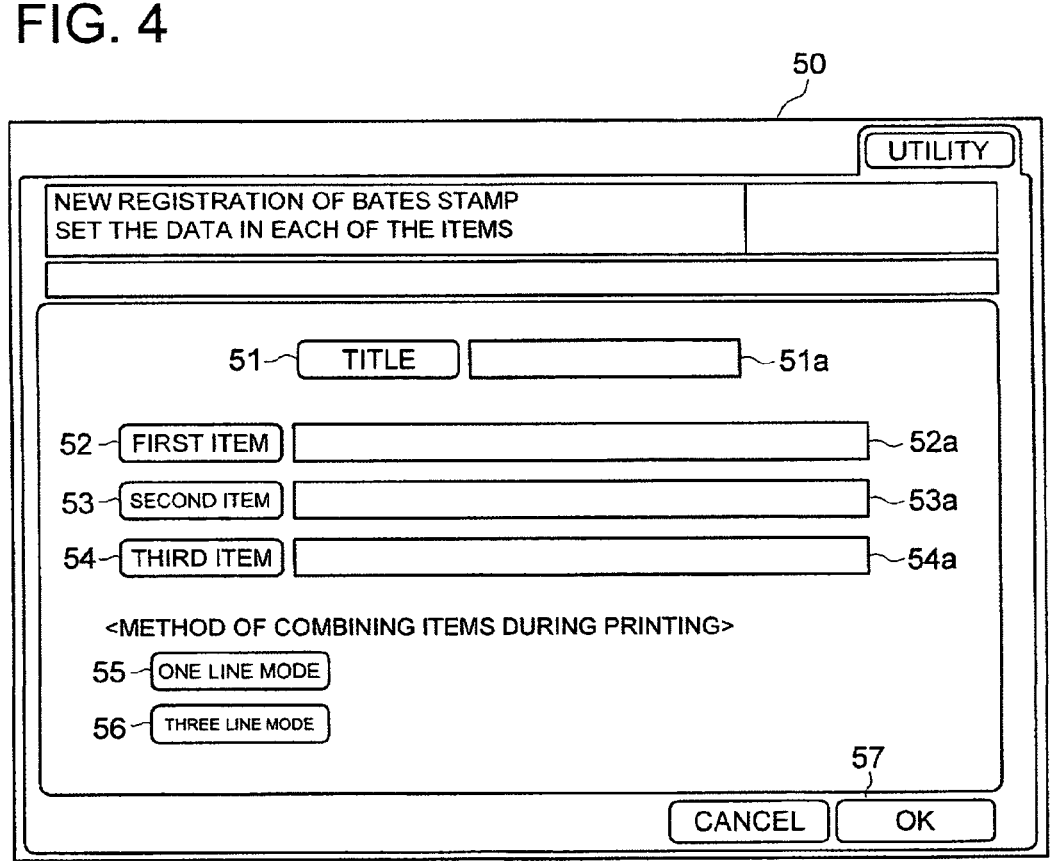
FIG. 4 is a front view showing an example of Bates stamp registration screen.

FIG. 3 shows an example of Bates stamp registration list screen 40. Bates stamp registration list screen 40 is displayed in operation display section 15 when a registration of settings button of Bates stamp is selected in the operation screen not shown in drawing. Selection buttons 41 for selecting the type of stamp are displayed in the Bates stamp registration list screen 40 in a form of a horizontal and vertical matrix. Selection buttons 41 where titles are not indicated are the buttons that are not yet registered, and selection buttons 41 where the titles of the corresponding stamp type are indicated are registered. When new registration button 42 or edit button 43 at the bottom part of Bates stamp registration list screen 40 is operated, Bates stamp registration screen 50 shown in FIG. 4 is displayed in operation display section 15.

Figure 5:
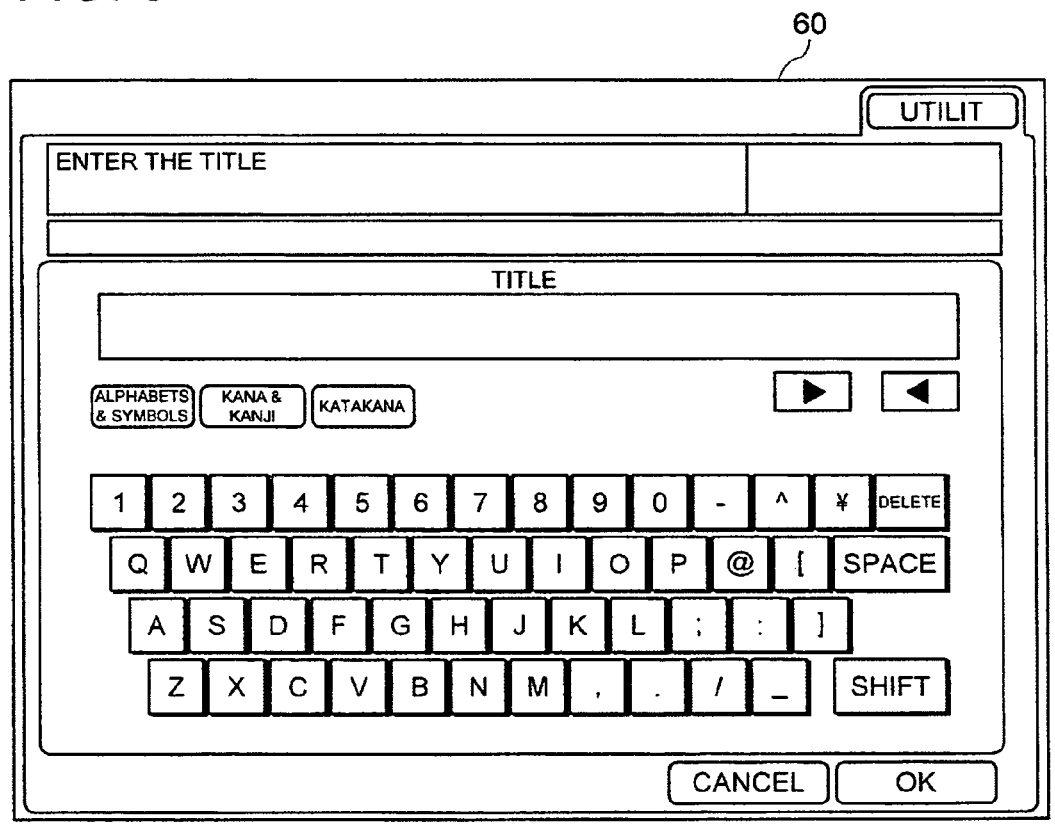
FIG. 5 is a front view showing an example of an input screen.
Figure 6:
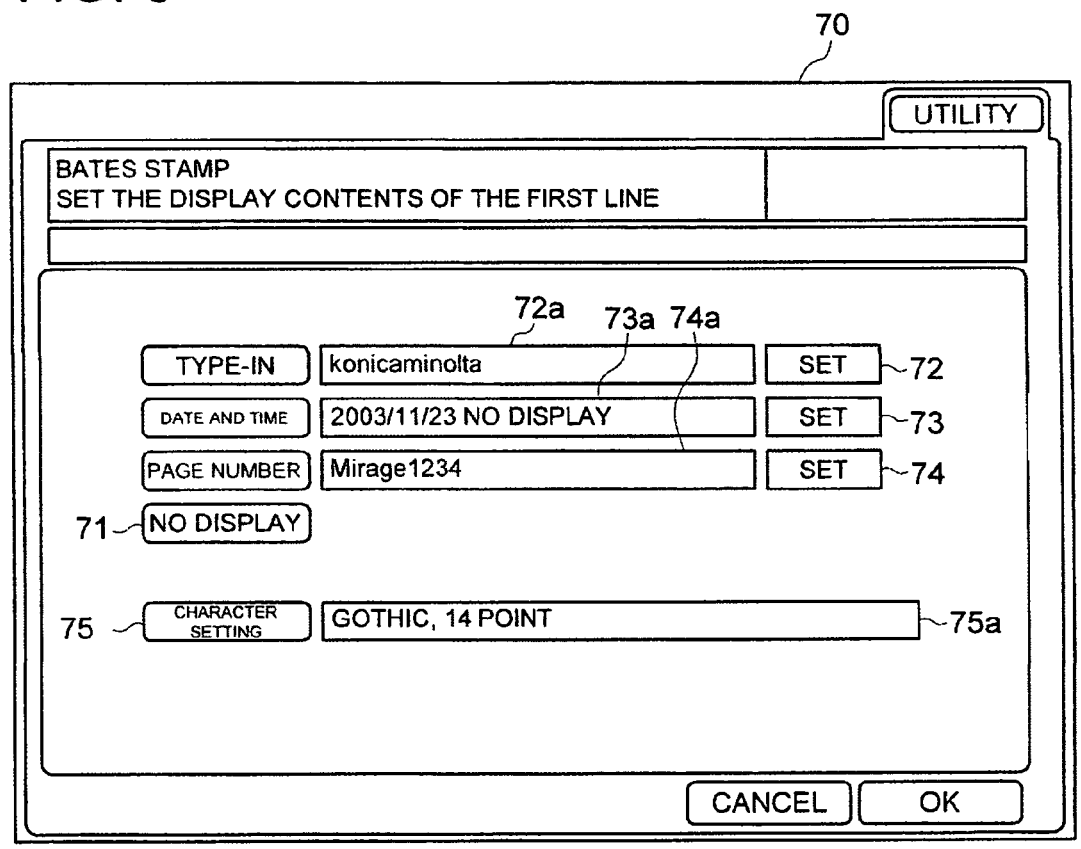
FIG. 6 is a front view showing an example of a data input screen.

When the title button 51 is operated in Bates stamp registration screen 50, input screen 60 shown in FIG. 5 is displayed, and it is possible to input discretional character string as a title of a stamp type. The title that is inputted is displayed in title display box 51a on the right of title button 51 in Bates stamp registration screen 50. When any one of first item button 52, the second item button 53, or the third item button 54 is operated, data input screen 70 shown in FIG. 6 is displayed in operation display section 15, and input of data related to each item is enabled.

When display off button 71 in data input screen 70 is operated, data display off is set for relevant item. If type in setting button 72 is operated, the display shifts to input screen 60 which is similar to that shown in FIG. 5, and a discretional character string can be set as display contents of a relevant item. The contents of setting are displayed in type in display box 72a of data input screen 70.

Figure 7:
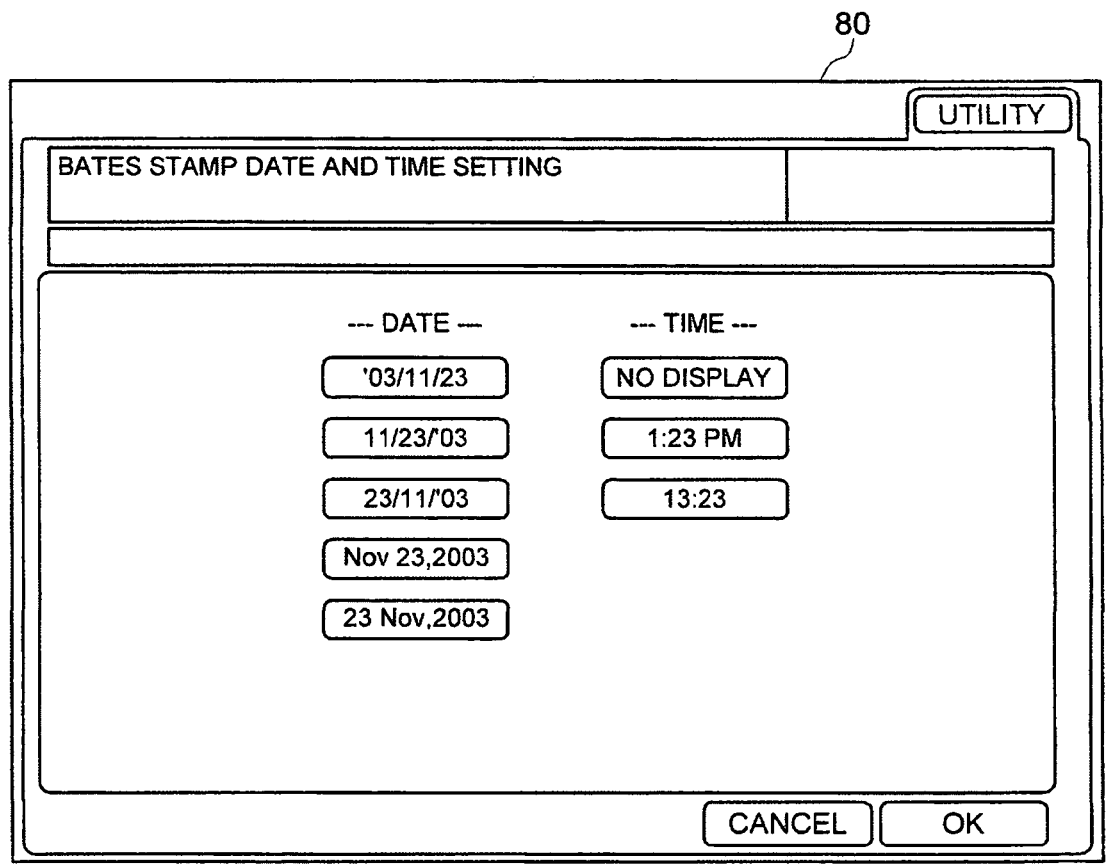
FIG. 7 is a front view showing an example of a date and time setting screen.

When date and time setting button 73 is operated in data input screen 70, date and time setting screen 80 shown in FIG. 7 is displayed in operation display section 15. The display formats of date and time are selected in this screen 80. An example of display of date and time according to the settings made in date and time settings screen 80 is shown in date and time display frame 73a of data input screen 70.

Figure 8:
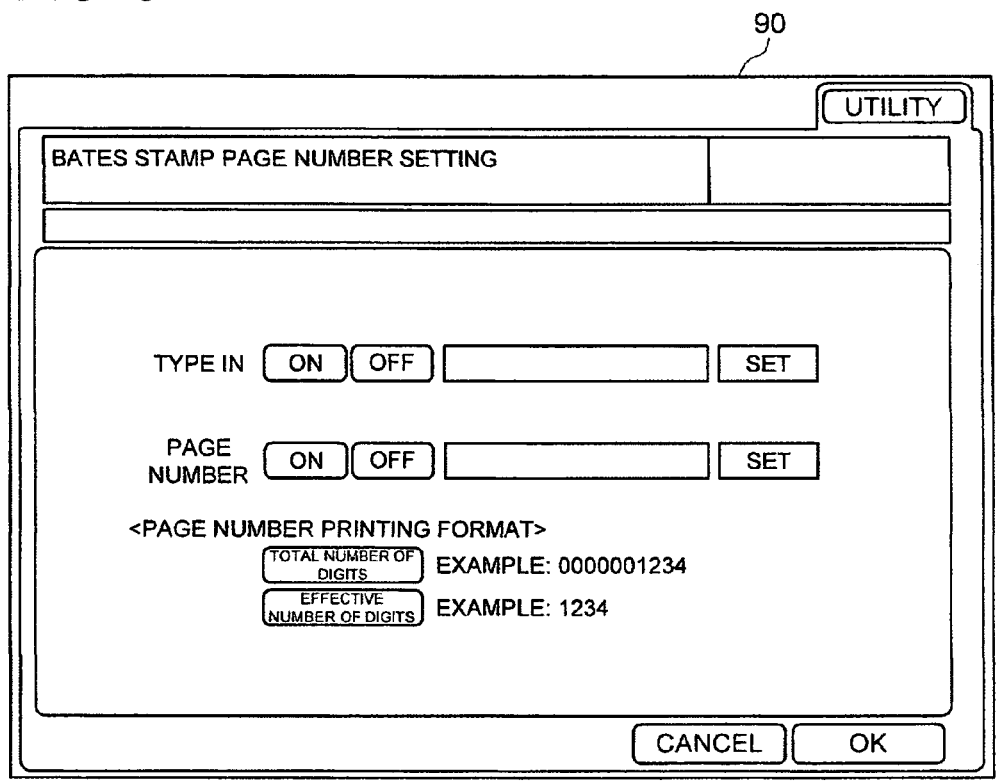
FIG. 8 is a front view showing an example of a page number setting screen.

When page number setting button 74 is operated in data input screen 70, page number setting screen 90 shown in FIG. 8 is displayed in operation display section 15. It is possible to set display ON/OFF and the number of digits in this screen 90. Also, it is possible to set whether a character string is prefixed to the page number or not, and to set a character string of contents to be prefixed to the page number. An example of display of the page number according to the settings made in page number settings screen 90 is shown in the page number display frame 74a of data input screen 70.

Figure 9:
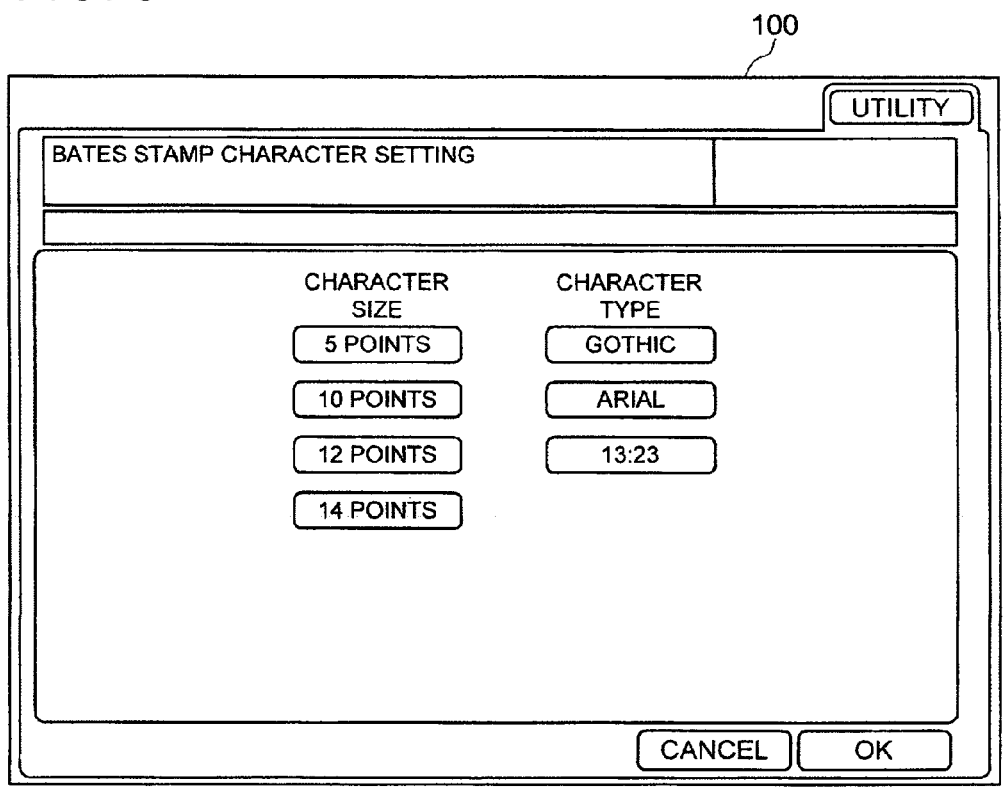
FIG. 9 is a front view showing an example of a character setting screen.

When character setting button 75 is operated in data input screen 70, character setting screen 100 shown in FIG. 9 is displayed in operation display section 15. Character size and character type are selected in this screen 100. The selected character size and type are displayed in character setting display frame 75a of data input screen 70.

The contents set in data input screen 70 are displayed respectively in first item display frame 52a, second item display frame 53a, the third item display frame 54a of Bates stamp registration screen 50.

When one line mode button 55 is operated in Bates stamp registration screen 50 of FIG. 4, a stamp format in which all contents set in the first item to the third item are displayed in one horizontal line is selected, and when three line mode button 56 is operated, a stamp format in which contents set in the first item to the third item is divided and displayed in three vertical lines is selected. The contents of the settings are confirmed when OK button 57 is operated, and the display returns to Bates stamp registration list screen 40. In this way, the contents of each stamp registered are stored in non-volatile storage device 13 and are used at the time of combining the stamps.

Figure 10:
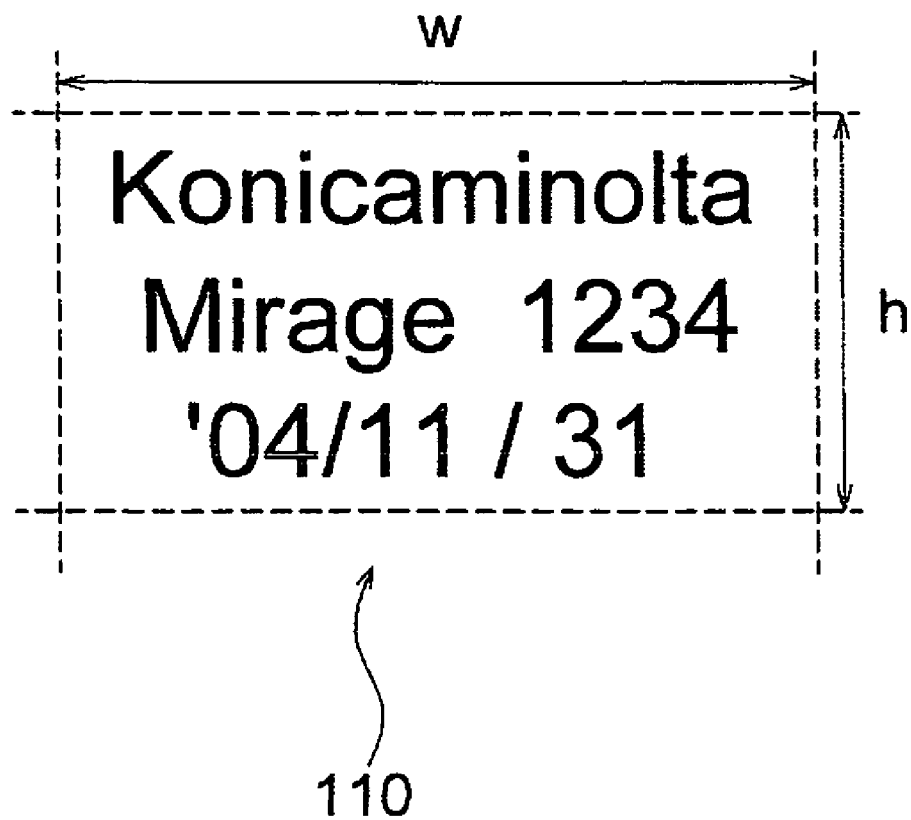
FIG. 10 is an explanatory diagram showing an example of Bates stamp which is set.

FIG. 10 shows an example of Bates stamp which is set. This Bates stamp 110 is a Three Line mode stamp. The basic size at the time of printing this Bates stamp 110 is h (vertical)×w (horizontal). The basic size is determined depending on the contents of the setting of Bates stamp, and is derived from the number of characters, the character size, the format (Three Line mode or One Line mode), etc.

Next, the operations of combining Bates stamp in the document and printing out are explained here.

The stamping process has an automatic combining mode in which a position of combining stamp is automatically identified and a position designation mode in which the user designates a position in which the stamp is to be combined. The mode to be used can be selected in an unillustrated selection screen.

Figure 11:
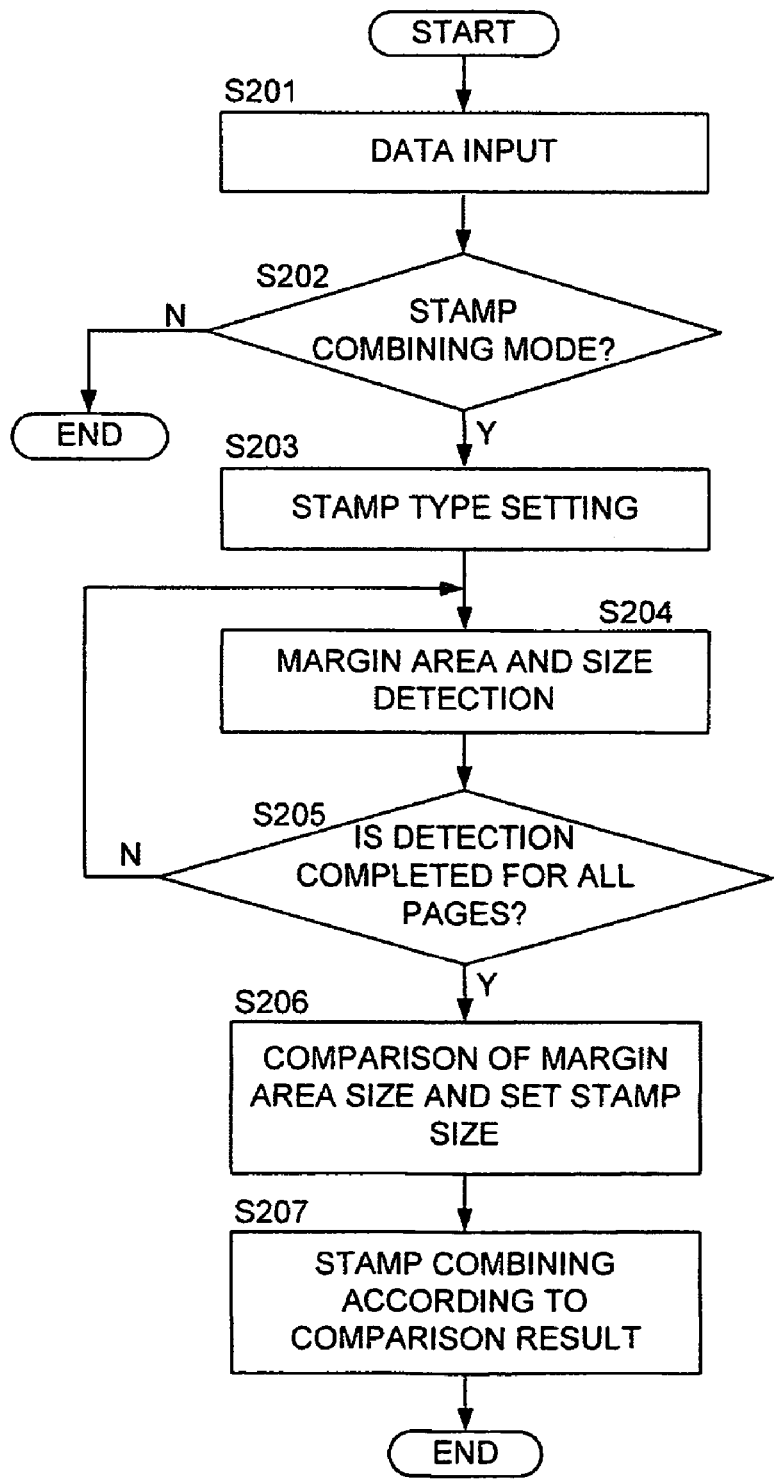
FIG. 11 is a flow chart showing a stamp combining process when Bates stamp is combined with an original document in an automatic image combining mode.
Figure 12:
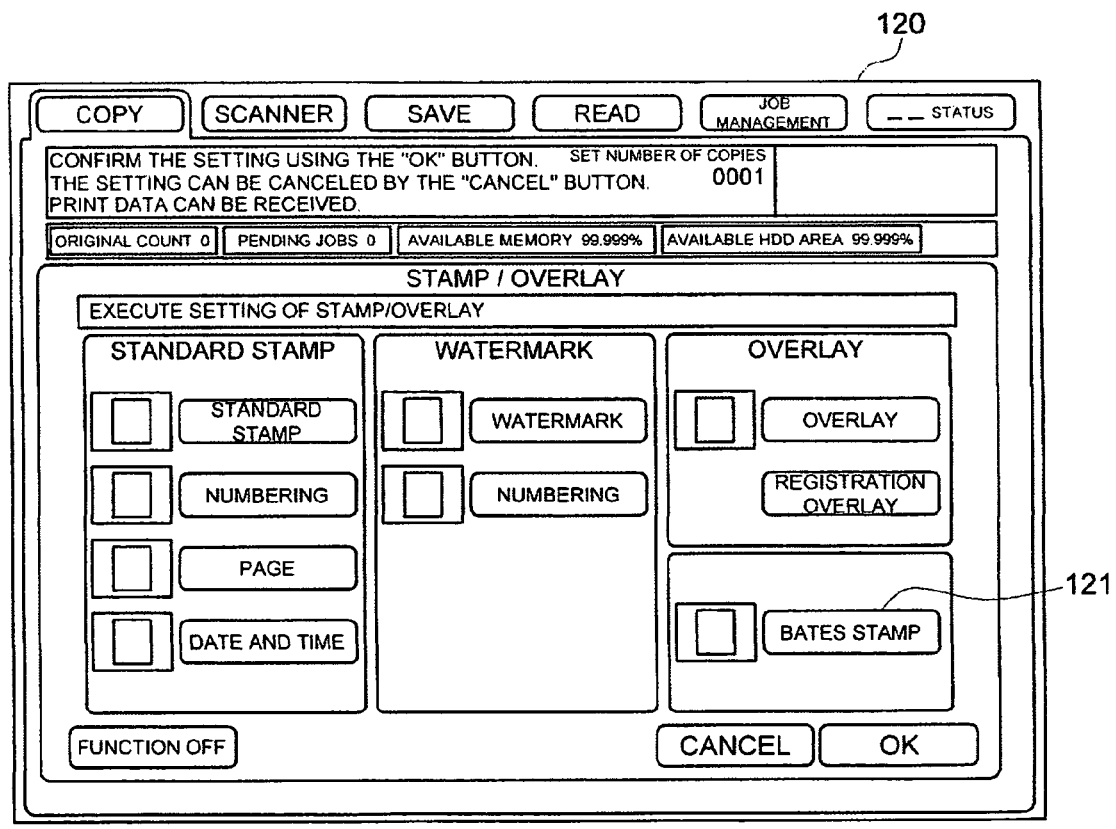
FIG. 12 is a front view showing an example of a stamp overlay selection screen.

FIG. 11 shows a flow of stamp combining processes in case Bate stamp is combined with a document in the automatic combining mode. After selecting Bates stamp button 121 in stamp overlay selection screen 120 shown in FIG. 12, when the START button not shown in drawing is operated, image processing apparatus 10 loads image data of all pages of the document that become original images (Step S201). The loading of the image data is carried out either in the scanner section 16 by reading the document optically, or by receiving from an external terminal via communication interface 14. The image data loaded is temporarily saved in non-volatile storage device 13.

Here, if the START button is pressed without Bates stamp button 121 of the stamp overlay selection screen 120 being operated (N in Step S202), these processes will be terminated (END), since the processes are not included in the stamp combining mode. In this case, a copying process or a printing process will be carried out according to the contents of a job that is set.

If the process are to be carried out in the stamp combining mode (Y in Step S202), an unillustrated operation screen accepts the operation of setting the stamp type (Step S203). Detection section 22 carries out image analysis for each page of the document that is read beforehand and stored in the non-volatile storage device 13 by OCR (Optical Character Reader) processing and detects blank space areas in each page (Step S204).

At this point, the maximum blank space area size (horizontal×vertical) that can be acquired within the blank space areas of each page in a shape of a rectangle and the position of the area are obtained. The position can be described either as a rough location such as top right, bottom right, top left, bottom left, top center, bottom center, or in terms of a coordinate position taking the top left of the document as an origin.

After the process of detecting the blank space area is carried out for each page of the document (N is Steps S204 and S205), and the detection process are completed for all the pages of the document (Y in Step S205), determination section 23 seeks size of the maximum blank space area which can fit within blank space areas of all pages of the document in uniform size, and compares the size of maximum blank space area with base size (original size) of the stamp to be combined, then determines image size so as to fall into the maximum blank space area when the stamp is combined( Step S206).

Here, the blank space area size is considered as vertical size and horizontal size, the smallest vertical size and the smallest horizontal size in the blank space area size of all the pages of the document are extracted respectively, and then size of rectangle having these vertical and horizontal sizes becomes size of the largest available uniform blank space area in all the pages of the document.

For example, in an example of the detection result list table 130 shown in FIG. 13, the size of the blank space area in the first page is 30×28 mm, the size of the blank space in the second page is 40×35 mm, the size of the blank space area in the third page is 25×30 mm, and the size of the blank area in the fourth page is 50×50 mm. Therefore, the vertical size of 25 mm of the third page which is the lowest value of the vertical size and the horizontal size of 28 mm of the first page which is the lowest value of the horizontal size are combined together to determine the maximum blank space area size to be 25 mm×28 mm.

Here, if the basic size of the stamp to be combined this time is less than the maximum blank space area size, the basic size is determined as the image size at the time of combining the stamp. On the other hand, if the maximum blank space area size is smaller than the basic size, the image size is determined so as to fits within the maximum blank space area size. For example, a reduction factor is determined so as to obtain the largest image size or the image size that fits into the maximum blank space area size while maintaining the same aspect ratio.

Combining section 24 prints out after combining Bates stamp in each page of the original document with the image size determined as above (Step S207). Combining positions are positions of the maximum blank space areas on each page detected during the process of detecting the blank space area (Step 204).

Meanwhile, it may be controlled so that the stamp is combined at the same position as much as possible for each page of the original document. For example, control can be carried out to standardize the position of combining the stamp to be at top right as much as possible. In specific terms, after determining section 23 determines the image size, and checking whether or not a blank space area smaller than the image size is present in the top right part of each page, the stamp is combined to be in the image size at the top right part of the pages in which the blank space area not smaller than the image size determined by determination section 23 exists at the top right part of the page. For the pages in which the blank space area not smaller than the image size determined by determination section 23 does not exist at the top right part of the page, the stamp is combined in other positions, for example, a maximum blank space area detected in the page.

Further, a priority order of the combining positions is determined beforehand such as top right, bottom right, top left, bottom left, . . . , etc., presence or absence of a blank space area not smaller than the image size determined by determining section 23 is checked in each page according to the priority order, and the stamp may be combined at the first detected position. In this case, it is preferable to find out and store the available blank space area size at each of the positions of top right, bottom right, top left, bottom left, etc., during the detection process (Step S204) which is carried out in the beginning.

In addition, among a plurality of predetermined candidates for stamp combining position such as top right, bottom right, top left, bottom left, . . . , etc., a combining position where blank space area for image size is acquirable commonly in the largest number of pages is selected, and Bates stamp is combined in the combining position for the pages in which the combining is possible in the selected combining position.

In this manner, since a Bates stamp having uniform size is combined in all pages based on the result of that detection by detecting blank space area for all pages of the document, Bates stamp can be combining with a good appearance while maintaining uniformity of the document without overlapping with the original document.

Figure 14:
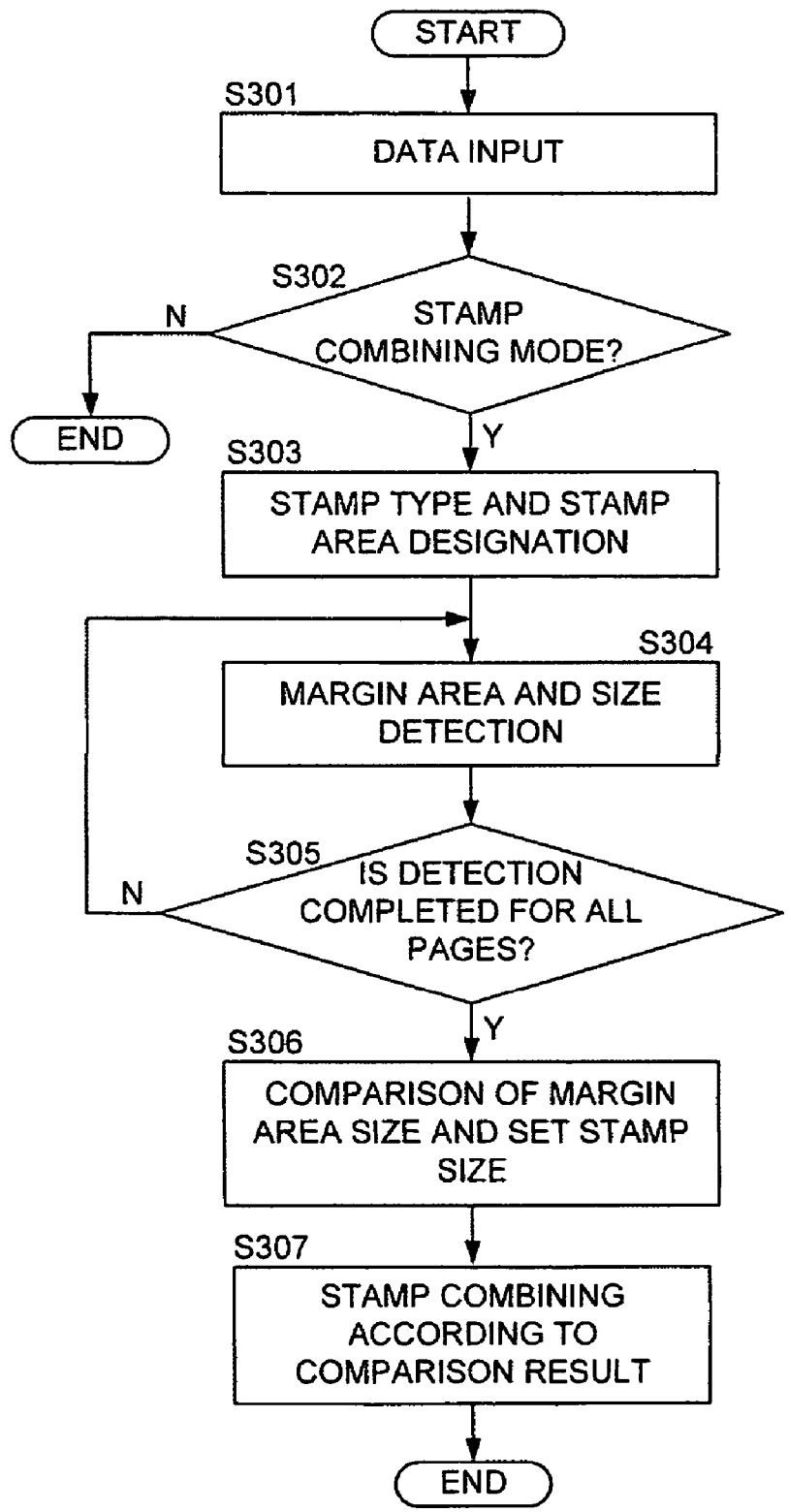
FIG. 14 is a flow chart showing a stamp combining process when Bates stamp is combined with an original document in a position designation mode.

FIG. 14 shows a flow chart of a stamp combining process when Bates stamp is combined with an original document in the position designation mode. A process of loading the image data (Step S301) and a process of confirming the stamp combining mode (Step S302) are similar to Step S201 and Step S202 of FIG. 11.

In case of the stamp combining mode (Y in Step S302), the setting of the stamp type and the stamp combining position (stamp area) are designated in an unillustrated operation screen (Step S303). The stamp combining position is roughly designated as top right, bottom right, top left, bottom left, top center, bottom center, etc. It can also be designated in terms of a coordinate position taking the top left, etc., of the document as an origin.

Next, detection section 22 carries out image analysis by OCR (Optical Character Reader) processing, for image data at a designated combining position (designated position) of each page of the document which is read in advance and stored in non-volatile storage device 13 and detects blank space areas near the designated position in each page (Step S304). For example, if the position is designated at top right, the designated area is an area of 50 mm square from the top right edge of the page and status of blank is detected within this 50 mm square area. Here, the maximum blank space area size which can be acquired in a rectangular shape (vertical× horizontal) is sought in the designated position.

After the process of detecting the blank space area is carried out for each page of the document (N is Steps S304 and S305), and the detection process are completed for all the pages of the document (Y in Step S305), the determination section 23 seeks size of the maximum blank space area which can fit within blank space areas of all pages of the document in uniform size, and compares the size of maximum blank space area with base size of the stamp to be combined, then determines image size so as to fall into the maximum blank space area when the stamp is combined (Step S306).

Here, similar to the case of automatic combining mode, the blank space area size is considered as vertical size and horizontal sizes, the smallest vertical size and the smallest horizontal size in the size of the blank space areas of all the pages of the document are extracted respectively, and then the size of rectangle having these vertical and horizontal sizes becomes the size of largest available uniform blank space area in all the pages of the document.

Then, if the basic size of the stamp to be combined this time is no larger than the maximum blank space area size, the basic size is determined to be the image size at the time of combining the stamp, and if the maximum blank space area size is not larger than the basic size, the image size is determined so as to fits within the maximum blank space area size. For example, the largest image size which can fit within the maximum blank space area size while maintaining an aspect ratio is determined to be the image size.

Combining section 24 prints out after combining Bates stamp at the designated position on each page of the original document with the image size as determined above (Step S307).

In this manner, since Bates stamp having uniform size is combined in all pages based on the result of the detection by detecting blank space areas at the designated position for all pages of the document, Bates stamp can be combining with a good appearance while maintaining uniformity of the document without overlapping with the original document.

Further, when Bates stamp is reduced so that the image size fit within the maximum blank space area size, it is desirable to carry out control so that excessive size reduction is not carried out if the character size after reduction becomes smaller than a permissible minimum character size, for example, less than 5.0 points.

Figure 15:
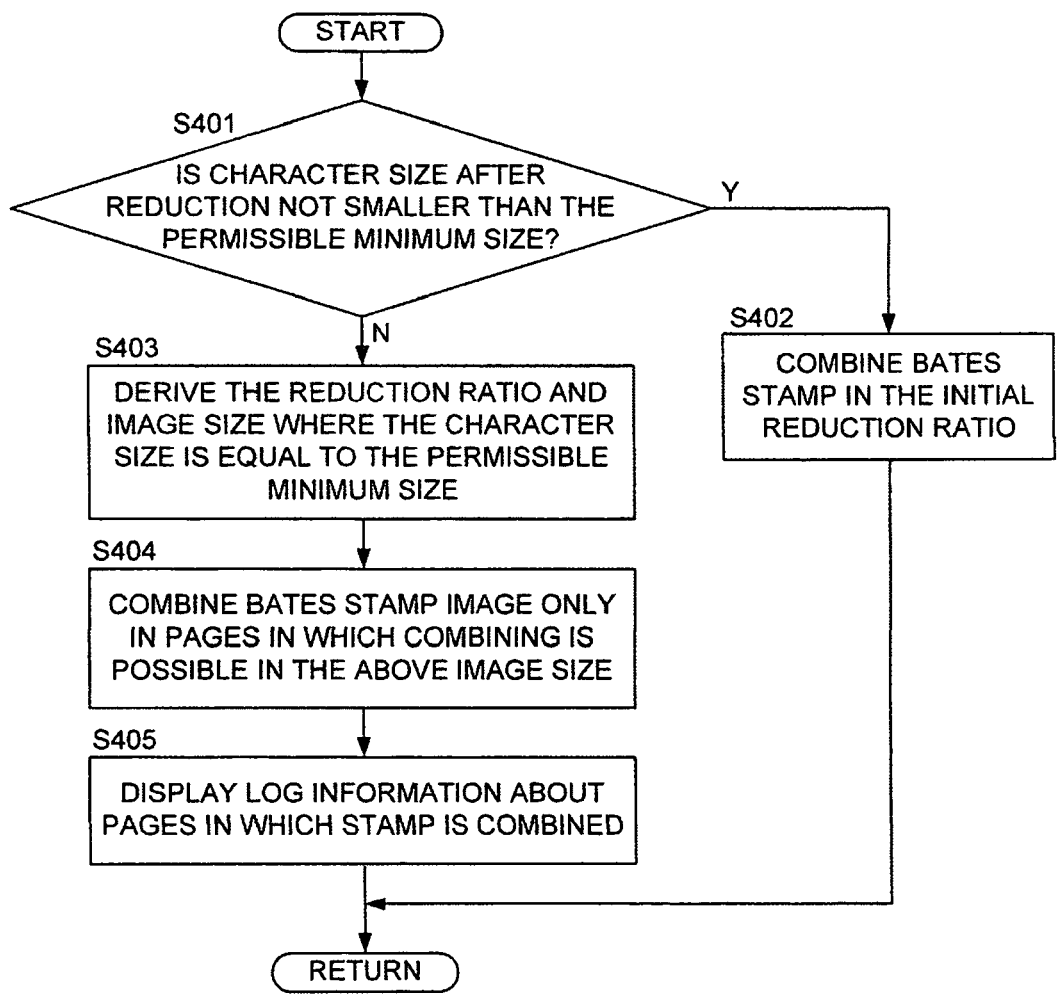
FIG. 15 is a flow chart showing a process where control is carried out so that character size does not become less than the smallest permissible size.

For example, FIG. 15 shows the flow of the process when the above control is carried out in the part of Step S207 of FIG. 11 or Step S307 of FIG. 14 (stamp combining according to the result of comparison).

To begin with, when reduction of the Bates stamp is to be carried out, a judgment is made (Step S401) as to whether or not the character size after that reduction becomes smaller than the permissible minimum character size (for example, 5.0 points) that is determined beforehand, and if the stamp can be combined while maintaining a character size larger than the permissible minimum character size (Y in Step S401), the Bates stamp is combined maintaining the original reduction ratio (Step S402).

On the other hand, if the character size becomes smaller than the permissible minimum character size (N in Step S401), a reduction ratio in which the Bates stamp is reduced so that character size becomes equal to the permissible minimum character size, and image size of the Bates stamp after reduction by the reduction ratio are obtained (Step S403), and the Bates stamp is combined to be in the aforesaid image size only in pages in which Bates stamp having the aforesaid size is able to be combined (Step S404), then for the pages in which the Bates stamp is not able to be combined, log information thereof is recorded and displayed (Step S405). Meanwhile, as another example of the control when the character size after reduction becomes smaller than the permissible minimum character size, by omitting the pages in which the character size after reduction being smaller than the permissible minimum character size is caused, from objective page where Bates stamp is added, Bates stamp may be combined in the objective pages except the omitted pages in accordance with the result of comparison.

In this way, it is possible to prevent the character size after reduction from becoming excessively small due to an extremely narrow blank space area. In addition, even if there is no blank space area, disability of combining Bates is judged, and the log information thereof is recorded and displayed accordingly.

In the above, although a preferred embodiment of the present invention was described with reference to drawings, the concrete configuration shall not be construed to be limited to that given in the preferred embodiment, and any changes or additions within the scope and intent of the present invention shall be included in the present invention.

For example, the additional image is not restricted to Bates stamp.

In addition, in the preferred embodiment, when the Bates stamp is combined in the basic size, the basic size of the designated Bates stamp is smaller than the maximum blank space area size, however, it is possible to fit an image size with the maximum blank space area size, irrespective of whether or not the basic size is smaller than the maximum blank area size. When the image size is smaller than the maximum blank space area size, the size can be discretional.

Further, in the preferred embodiment here, while the largest available blank space area size is sought from all the pages or from the designated position in all the pages, and the image size at the time of combining the stamp is determined by comparing the maximum blank space area size with the basic size of the stamp, it is also possible to determine the image size that fits within the blank space area using some other methods. For example, by setting the basic size of a designated stamp as the initial value of the image size, and by checking whether or not the stamp of the image size fits within the blank space area sequentially from the first page, if it does not fit, changing of the image size to the maximum size which can fit a blank space area of the relevant page is carried out through the pages to a last page, and a final image size can be determined to be an image size at the time of combining the image.

Further, in the embodiment, while a multi-function peripherals have been explained as examples, it can also be a printer or a copying machine, and if the stamp combining process can be carried out, it can also be an image processing apparatus without a printer section, and the composite image can be output to an external printer unit.

According to the preferred embodiment of the present invention, the blank space area is detected for all the pages of the original document, image size capable of being added in blank space areas of all pages in uniform size is determined, and the additional image is combined to be in the determined image size. In other words, an additional image having uniform size is combined on all the pages of the document, without overlapping with the original image.

Meanwhile, the combining position within the page is not considered as long as the image size is the same. In addition, the image size is only necessary to be not larger than the maximum size which enables the additional image to be added within blank space areas of all pages in uniform size.

For example, if image size designated by a user is not larger than largest size which allows the additional image to be combined within the blank space areas of all pages in uniform size, the additional image is combined in the size designated by the user, and if image size designated by the user exceeds the maximum size which allows the additional image to be combined within the blank space areas, the image size is reduced to be smaller than the maximum size so that the additional image can be combined. When reducing size, it is preferred to maintain an aspect ratio as it is.

According to another aspect of the preferred embodiment of the present invention, the determination section of the image processing apparatus seeks maximum blank space area size which can be commonly acquired in each pages from a detected result by the detecting section, and the image size is determined based on the maximum blank space area size.

In the above embodiment, the determination section seeks maximum blank space area size which can be commonly acquired in each page, and image size at combining can be determined comparing the maximum blank space area size with the additional image size. For example, if the blank space area is a rectangular, a largest acquirable rectangular blank space areas is sought among blank space areas on each page, a smallest vertical dimension and a smallest horizontal dimension among all the largest rectangular blank space areas are sought, and a maximum blank space area size having these vertical and horizontal dimensions is determined, then an image size (horizontal dimension and vertical dimension) of an additional image is determined.

According to another aspect of the preferred embodiment of the present invention, the combining section combine the additional image in the prescribed position with the aforesaid image size, for the pages having a blank space area which size is more than the image size determined by the determination section at a prescribed position in the page.

In the above embodiment, if blank space area having size larger than the determined image size exists at the prescribed position in the page, the additional image is combined in the prescribed position, and if the blank space area having size larger than the determined image size do not exist in the prescribed position in the page, the image is combined in other position in the page. In other words, when a blank space area larger than the image size exists in the page at a position other than the prescribed position, the image is combined preferentially in the prescribed position. In this way, it is possible to uniform the position of combining the additional image as much as possible at the prescribed position. The prescribed position can be a designated position by a user, or can be a position in which a largest number of pages among a plurality of pages constituting the document can be acquired.

According to another aspect of the preferred embodiment of the present invention, the image processing apparatus having a detection section to detect the blank space area at a prescribed position within the page for all pages in a document having a plural number of pages, a determining section to determine the size of the additional image based on the detection result of the detection section that, at the time of combining a specified additional image in uniform size for all the pages of the original document at the prescribed position, and a combining section to combine the additional image having image size determined by the determination section at the prescribed position in each page of the original document.

In the above, the blank space area at the prescribed position within the page is detected for all the pages of the original document, the image size is determined that can be combined at the prescribed position in all the pages in uniform size. In other words, for all the pages of the document, an additional image having uniform size is combined at the same position without overlapping with the original image.

According to another aspect of the preferred embodiment of the present invention, the determination section seeks maximum blank space area size which can be commonly acquired in each pages based on a detected result by the detecting section, and the image size is determined based on the maximum blank space area size.

In the above embodiment, the determination section seeks maximum blank space area size which can be commonly acquired in each page, and image size at combining can be determined comparing the maximum blank space area size with the additional image size. For example, if the blank space area is a rectangular, a largest acquirable rectangular blank space areas is sought among blank space areas in each page, a smallest vertical dimension and a smallest horizontal dimension among all the largest rectangular blank space areas are sought, and a maximum blank space area size having these vertical and horizontal dimensions is determined, then an image size (horizontal dimension and vertical dimension) of an additional image is determined.

According to another aspect of the preferred embodiment of the present invention, the image processing apparatus includes a designation section to designate the designated position.

According to another aspect of the preferred embodiment of the present invention, when the maximum blank space area size is larger than the size of the additional image, the determining section determines the size of the additional image as the image size.

In the above, in case it is possible to combine the additional images in an original size designated by the user as it is, the additional image is combined in the original size. The desired size of the user has priority.

According to an image processing apparatus of the present invention, since the blank space areas of all pages of the document are detected, and since the additional image is combined in the uniform size in all the pages based on the detection result, it is possible to combine additional images in the uniform size in all the pages without overlapping with the original image, and it is possible to combine the additional images so that the entire document has uniformity and good appearance.

When an additional image having uniform size is added at the same position on the page, both the combining position and the size become uniform, and hence it is possible to combine the additional image with better appearance.

What is claimed is:

1. An image processing apparatus, comprising:
a detecting section to detect blank space areas in each page of a document;
an additional image designating section to designate an additional image to be added to each page of the document;
a first determining section to determine a horizontal×vertical size of a largest blank space area in each page of the document, and to determine a maximum uniform blank space area size, which does not exceed the horizontal size of the largest blank space area in any page of the document and which does not exceed the vertical size of the largest blank space area in any page of the document, by comparing all of the determined horizontal×vertical sizes of the largest blank space areas on all of the pages of the document;
a second determining section to determine an image size of the additional image that is to be uniform on each page of the document based on the determined maximum uniform blank space area size; and
a combining section to combine the additional image on each page of the document in the image size determined by the second determining section;
wherein the first determining section, the second determining section and the combining section operate in sequence, such that the first determining section operates prior to the second determining section and the second determining section operates prior to the combining section.

2. The image processing apparatus of claim 1, wherein the additional image in the determined image size is combined within the largest blank space areas on each of the pages of the document, and wherein the image size of the additional image is determined to be within the maximum uniform blank space area size.

3. The image processing apparatus of claim 1, wherein the combining section combines the additional image in the determined image size within a predetermined area on a given page, and wherein a size of the predetermined area is larger than the image size of the additional image.

4. The image processing apparatus of claim 1, wherein the additional image has a predetermined size, and the second determining section determines the predetermined size as the image size when the maximum uniform blank space area size is larger than the predetermined size of the additional image.

5. An image processing apparatus, comprising:
a detecting section to detect a blank space area in a predetermined area on each page of a document;
an additional image designating section to designate an additional image to be added to the predetermined area on each page of the document;
a first determining section to determine a horizontal×vertical maximum uniform blank space area size which does not exceed a horizontal size of any of the detected blank space areas in the predetermined areas on each of the pages of the document, and which does not exceed a vertical size of any of the detected blank space areas in the predetermined areas on each of the pages of the document;
a second determining section to determine an image size of the additional image that is to be uniform on each page of the document based on the determined maximum uniform blank space area size; and
a combining section to combine the additional image within the predetermined areas on each of the pages of the document in the image size determined by the second determining section;
wherein the first determining section, the second determining section and the combining section operate in sequence, such that the first determining section operates prior to the second determining section and the second determining section operates prior to the combining section.

6. The image processing apparatus of claim 5, wherein the additional image in the determined image size is combined within the determined blank space areas of the predetermined areas on each of the pages of the document, and wherein the image size of the additional image is determined to be within the maximum uniform blank space area size.

7. The image processing apparatus of claim 5, further comprising a position designating section to designate positions of the predetermined areas.

8. The image processing apparatus of claim 5, wherein the additional image has a predetermined size, and the second determining section determines the predetermined size to be the image size when the maximum uniform blank space area size is larger than the predetermined size of the additional image.

9. The image processing apparatus of claim 5, wherein when the image size of the additional image determined by the second determining section is smaller than a permissible minimum size, the combining section combines the additional image in the permissible minimum size only in pages in which it is possible to combine the additional image in the permissible minimum size without overlapping with an original image.

10. The image processing apparatus of claim 9, further comprising a display section to display log information about a page of the document in which the additional image is not combined.

11. The image processing apparatus of claim 1, wherein when the image size of the additional image determined by the second determining section is smaller than a permissible minimum size, the combining section combines the additional image in the permissible minimum size only in pages in which it is possible to combine the additional image in the permissible minimum size without overlapping with an original image.

12. The image processing apparatus of claim 11, further comprising a display section to display log information about a page of the document in which the additional image is not combined.

13. The image processing apparatus of claim 1, wherein after the second determining section determines the image size of the additional image that is to be uniform on each page of the document, a control section, for each page of the document: (i) determines whether or not a blank space area, whose size is not smaller than the determined image size of the additional image, exists within a predetermined area, and (ii) when the blank space area within the predetermined area exists, the control section controls the combining section to combine the additional image in the blank space area within the predetermined area.

14. The image processing apparatus of claim 13, wherein for each page of the document, when the control section determines that the blank space area within the predetermined area does not exist, the control section controls the combining section to combine the additional image in the corresponding determined largest blank space area.

15. The image processing apparatus according to claim 13, wherein the control section, for each page of the document, determines a combining position of the additional image in the image size determined by the second determining section in accordance with a priority order of combining positions that is determined beforehand.

* * * * *